(12) United States Patent
Dos Santos et al.

(10) Patent No.: US 11,261,745 B2
(45) Date of Patent: Mar. 1, 2022

(54) ROTOR, TURBINE EQUIPPED WITH SUCH A ROTOR AND TURBOMACHINE EQUIPPED WITH SUCH A TURBINE

(71) Applicant: SAFRAN AIRCRAFT ENGINES, Paris (FR)

(72) Inventors: Antoine Hervé Dos Santos, Moissy-Cramayel (FR); Quentin De Richaud, Moissy-Cramayel (FR); Nicolas Xavier Trappier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 149 days.

(21) Appl. No.: 16/738,543

(22) Filed: Jan. 9, 2020

(65) Prior Publication Data

US 2020/0277866 A1    Sep. 3, 2020

(30) Foreign Application Priority Data

Jan. 11, 2019 (FR) ..................... 1900283

(51) Int. Cl.
*F01D 5/32* (2006.01)
*F01D 5/08* (2006.01)
*F01D 5/30* (2006.01)

(52) U.S. Cl.
CPC ............. *F01D 5/323* (2013.01); *F01D 5/081* (2013.01); *F01D 5/3015* (2013.01);
(Continued)

(58) Field of Classification Search
CPC ........ F01D 5/323; F01D 5/081; F01D 5/3015; F01D 5/082; F01D 5/3007; F01D 5/02;
(Continued)

(56) References Cited

U.S. PATENT DOCUMENTS 3,834,831 A    9/1974  Mitchell
4,685,863 A *  8/1987  McLean .................. F01D 11/02
                                                        416/95
(Continued)

FOREIGN PATENT DOCUMENTS

EP       0 043 300 A2     1/1982
EP       2 009 234 A1    12/2008
(Continued)

OTHER PUBLICATIONS

French Preliminary Search Report for FR 1900283 dated Sep. 17, 2019.

*Primary Examiner* — Justin D Seabe
*Assistant Examiner* — Eric A Lange
(74) *Attorney, Agent, or Firm* — Sughrue Mion, PLLC

(57) ABSTRACT

The present invention relates to a rotor (1) of a turbomachine turbine, comprising a rotor disc (2) and a plurality of blades (3) distributed at its periphery, said rotor disc (2) comprising a plurality of mainly axial cells (23), each blade (3) comprising a root (32), retained in one of the cells (23) of said rotor disc, each root being dimensioned so as to form a space (4) between the bottom of the cell (23) and the radially inner face (324) of the root.

This rotor is remarkable in that said root comprises a mainly axial blind hole (5) opening onto the upstream face of the root and a plurality of mainly radial air ejection orifices (6), each air ejection orifice (6) opening into said blind hole (5) and onto the radially inner face (324) of the root located facing the bottom of the cell (23).

13 Claims, 6 Drawing Sheets

(52) U.S. Cl.
CPC .... *F05D 2220/323* (2013.01); *F05D 2240/30* (2013.01); *F05D 2240/55* (2013.01); *F05D 2250/70* (2013.01); *F05D 2260/20* (2013.01); *F05D 2260/30* (2013.01)

(58) Field of Classification Search
CPC .. F01D 5/30; F05D 2220/323; F05D 2240/30; F05D 2240/55; F05D 2250/70; F05D 2260/20; F05D 2260/30; Y02T 50/60
See application file for complete search history.

(56) References Cited

U.S. PATENT DOCUMENTS

| | | | |
|---|---|---|---|
| 7,524,168 B2* | 4/2009 | Tschuor | F01D 5/187 416/248 |
| 9,181,805 B2* | 11/2015 | Coutandin | F01D 5/081 |
| 9,745,852 B2 | 8/2017 | Ahmad et al. | |
| 2005/0249590 A1* | 11/2005 | Marchi | F01D 5/3015 415/182.1 |
| 2017/0022817 A1* | 1/2017 | Alpan | F01D 5/082 |
| 2018/0112544 A1* | 4/2018 | Heselhaus | F01D 5/3015 |

FOREIGN PATENT DOCUMENTS

| | | |
|---|---|---|
| EP | 3 348 790 A1 | 7/2018 |
| JP | 58-72604 A | 4/1983 |

\* cited by examiner

ROTOR, TURBINE EQUIPPED WITH SUCH A ROTOR AND TURBOMACHINE EQUIPPED WITH SUCH A TURBINE

FIELD OF THE INVENTION

The invention lies in the general field of rotors of a turbomachine turbine.

More specifically, the present invention relates to a rotor comprising a rotor disc, provided at its periphery with cells for receiving the root of the blades of said rotor, this rotor being arranged to efficiently cool these cells.

The invention also relates to a turbomachine turbine equipped with such a rotor and a turbomachine comprising such a turbine.

STATE OF THE ART

In the attached FIG. 1, an example of a multi-stage B turbine A (here for example a low pressure turbine) can be seen. Each stage B successively includes a distributor C and a rotor (or rotor wheel) D, from upstream to downstream, relative to the direction of air flow in said turbine, (that is to say from left to right in FIG. 1).

The turbine A has a longitudinal axis XX'.

All the rotors D are assembled together, fastened on a rotation shaft not shown in the figures and simultaneously driven in rotation.

Each rotor D comprises a rotor disc E, at the periphery of which are fastened rotor blades F. In a manner known per se, each blade F comprises a root G and the rotor disc E includes at its periphery a plurality of axial cells H.

The roots G of the blades are mounted by fitting into said cells H, (tenon-mortise type fastening). This allows the radial retention of the blades.

When the rotor disc is in place, this axis of rotation coincides with the axis XX' of the turbine.

One of the main problems in dimensioning parts rotating at high speed is the centrifugal force and the mechanical stress it generates.

Another significant problem resides in the mechanical stresses which are exerted on the bottom of the cells of the rotor disc. Indeed, during the operation of the turbomachine, the airflow path of the turbine, (in which the blades are disposed), is traversed by gases whose temperature is very high. The disc cells which receive the roots of the blades being directly exposed to these gases, it is necessary to cool them in order to avoid any damage of the discs.

A device for cooling the cells of a turbomachine rotor disc is already known according to document FR 2 918 103. This device comprises an annular end plate mounted upstream and at a short distance from a rotor disc, so as to form therewith an annular space forming a cavity for diffusing cooling air. This cavity opens upstream, towards several air intake orifices, and downstream, into the entrance of said cells. However, there is a need to improve the cooling of the cells of this rotor disc.

A gas turbine rotor comprising a rotor disc, provided with a plurality of grooves used to receive the roots of the blades of this rotor, is already known according to document U.S. Pat. No. 9,745,852. The mounting is carried out so that there is a space between the bottom of the groove and the radially inner face of the root. The rotor disc is provided with a channel allowing to supply a cooling fluid into the space between the bottom of the groove and the inner face of the root.

Furthermore, the blade root is provided with a blind radial duct, disposed at a short distance from one of the end faces of the blade root. This blind radial duct opens into the space between the bottom of the groove and the inner face of the root.

A sealing element is placed at a short distance in front of said end face of the root and in front of the space between the blade root and the bottom of the groove.

A plurality of through axial outlet orifices is provided in said end face of the blade root. Each of these outlet orifices opens at one of its two ends onto said end face of the blade root and at its other end into said radial duct.

It is thus possible to introduce a cooling fluid into the channel formed in the rotor disc. After leaving the channel, this fluid successively passes through the space under the blade root, the radial duct, then the various outlet orifices and strikes the sealing element to cool the latter.

The axial outlet orifices are through and therefore are not blind. Furthermore, the radial duct does not open through the radially inner wall of each of the outlet orifices.

Finally, the operation of this device is radically different from that of the invention, since it does not allow redirecting the air coming from upstream of the rotor in the direction of the bottom of the cell for receiving the blade root.

A turbomachine rotor comprising a plurality of blades each received in one cell is also known according to document EP 3 348 790. The blade root has a groove which cooperates with a heat shield to define an axial channel. However, the air ejection orifices connect this axial channel to the upper portion of the blade and not to the radially inner face of the blade root. Therefore, they do not allow cooling the cell.

DISCLOSURE OF THE INVENTION

Therefore, a purpose of the invention is to solve the problems mentioned above.

To this end, the invention relates to a rotor of a turbomachine turbine, comprising a rotor disc and a plurality of blades distributed at its periphery, said rotor disc comprising a plurality of cells, which extend mainly axially and which are regularly distributed at its periphery around the axis of the rotor, each blade comprising a root mounted and retained in one of the cells of said rotor disc, each root being dimensioned so as to form a space between the bottom of the cell and the radially inner face of the root.

In accordance with the invention, said root comprises a blind hole which extends mainly axially and which opens onto the upstream face of the root and a plurality of air ejection orifices, said blind hole extends over the major portion of the axial length of the blade root, and each air ejection orifice extends mainly radially and opens at one of its ends into said blind hole and at its other end onto the radially inner face of the root located facing the bottom of the cell.

Thanks to these characteristics of the invention, the air arriving on the upstream face of the rotor disc is accelerated and directed towards the bottom of the cells where it achieves a cooling by air jets impact. Furthermore, the presence of the blind hole allows reducing the weight of the blade.

According to other advantageous and non-limiting characteristics of the invention, taken alone or in combination:

said blind hole has a radially inner wall, preferably planar, and each air ejection orifice opens at one of its ends onto said radially inner wall of the blind hole and at its other end onto the radially inner face of the root, located facing the bottom of the cell.

the root has a fir tree shape comprising a radially inner lobe and a radially outer lobe, said blind hole being formed in the radially inner lobe and said air ejection orifices being formed in the radially inner end of said radially inner lobe;

said blind hole has a dome-shaped cross section whose radially outer side is curved and radially inner side is straight;

the height of the blind hole is reduced over at least part of the length of said blind hole in the direction of the bottom of the blind hole;

the downstream end of the blind hole is curved and ends in a point and at least one air ejection orifice opens at this point;

the air ejection orifices are all aligned;

the air ejection orifices extend along at least two parallel lines;

said air ejection orifices of one line are axially and circumferentially offset relative to the air ejection orifices of another line;

the blade root is provided with a cover shaped to prevent the air from axially emerging into the space formed between the bottom of the cell and the radially inner face of the root;

the rotor comprises an air supply circuit formed between an upstream annular flange of the rotor disc, and an annular end plate mounted facing and at a distance from the upstream annular flange, the air supply circuit opening into the blind holes and/or into the cells.

The invention also relates to a turbomachine turbine comprising at least one rotor as mentioned above.

The invention finally relates to a turbomachine, such as an aircraft turbojet engine or turbo-prop, which comprises at least one turbine as mentioned above.

DESCRIPTION OF THE FIGURES

Other characteristics, purposes and advantages of the invention will emerge from the description which follows, which is purely illustrative and non-limiting, and which should be read with reference to the appended drawings in which.

DETAILED DESCRIPTION OF THE INVENTION

Figure 2:
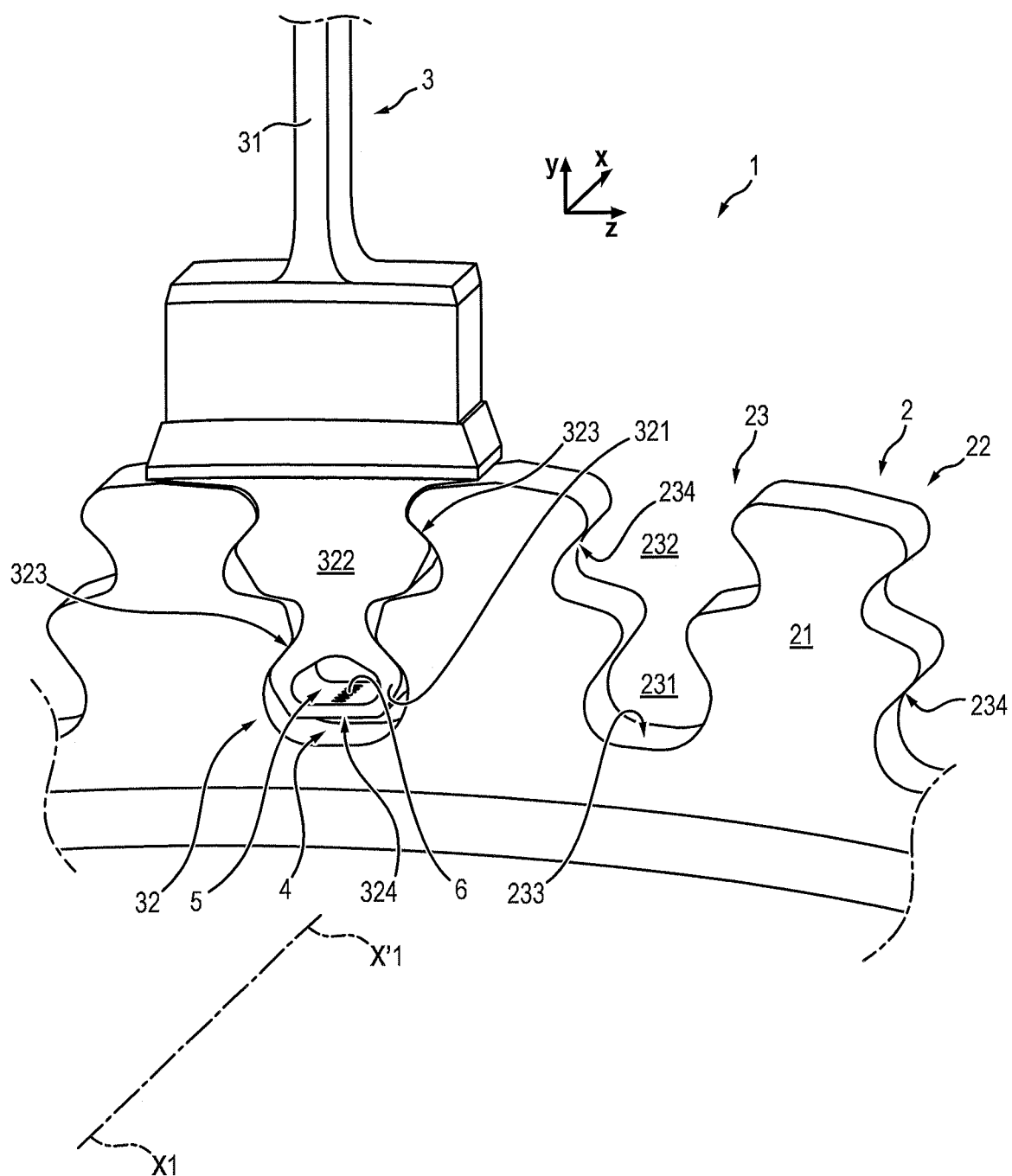
FIG. 2 is a perspective view of a portion of a rotor disc and a portion of a blade in accordance with a first embodiment of the invention.

As can be seen in FIG. 2, the turbine rotor 1 in accordance with the invention comprises a rotor disc 2 and a plurality of blades 3 distributed at its periphery, (a single blade being visible in FIG. 2). The turbine can be a high or low pressure turbine.

The disc 2 is intended to be driven in rotation about an axis of rotation X1-X'1, which coincides with its longitudinal axis.

At each point of the rotor 1, there is defined:
an axial direction x, parallel to the axis of rotation X1-X'1,
a radial direction y, which extends along a radius of the rotor perpendicularly to the axial direction x, and
a circumferential direction z, perpendicular to the axial direction x and to the radial direction y.

The disc 2 has an upstream face 21 and a downstream face 22 which are opposite, the terms "upstream" and "downstream" being considered relative to the direction of flow of the gases in the turbine.

The disc 2 further includes at its periphery a plurality of cells 23 that are radially open towards the outside of the disc 2 and distributed regularly around the axis of rotation X1-X'1 thereof. These cells extend mainly axially, that is to say that they are either axial or slightly inclined relative to the axial direction x.

Each blade 3 comprises an aerodynamic vane 31 which extends radially inwards by a root 32.

In the exemplary embodiment shown in the figures, the root 32 has a shape known to the person skilled in the art under the name "fir tree".

Thus, the root 32 has a radially inner lobe 321 and a radially outer lobe 322, the radially inner lobe 321 being narrower in the circumferential direction z than the lobe 322.

The cell 23 has a shape similar to that of the root 32. Therefore, it comprises a radially inner portion 231 and a wider radially outer portion 232.

The cell 23 has a bottom 233.

Each lobe 321, 322 of the root 32 has a dovetail shape in cross section. Each lobe 321, 322 comprises bearing surfaces 323 which bear against the retention faces 234 of the cells 23. Each root is thus mounted and retained in one cell.

The blade root 32 is configured and dimensioned so that there is a space 4 between its radially inner face 324, (here the radially inner face 324 of the radially inner lobe 321) and the bottom 233 of the cell 23, when the blade root is mounted in the cell 23. Preferably, the radially inner face 324 is planar.

In accordance with the invention, a blind hole 5 is formed in the root 32 of the blade. In the embodiment of the root shown in the figures, the blind hole 5 is formed in the radially inner lobe 321. This blind hole extends mainly axially. Preferably, this blind hole 5 extends in a direction parallel to that of the bottom of the cell 23.

Figure 6:
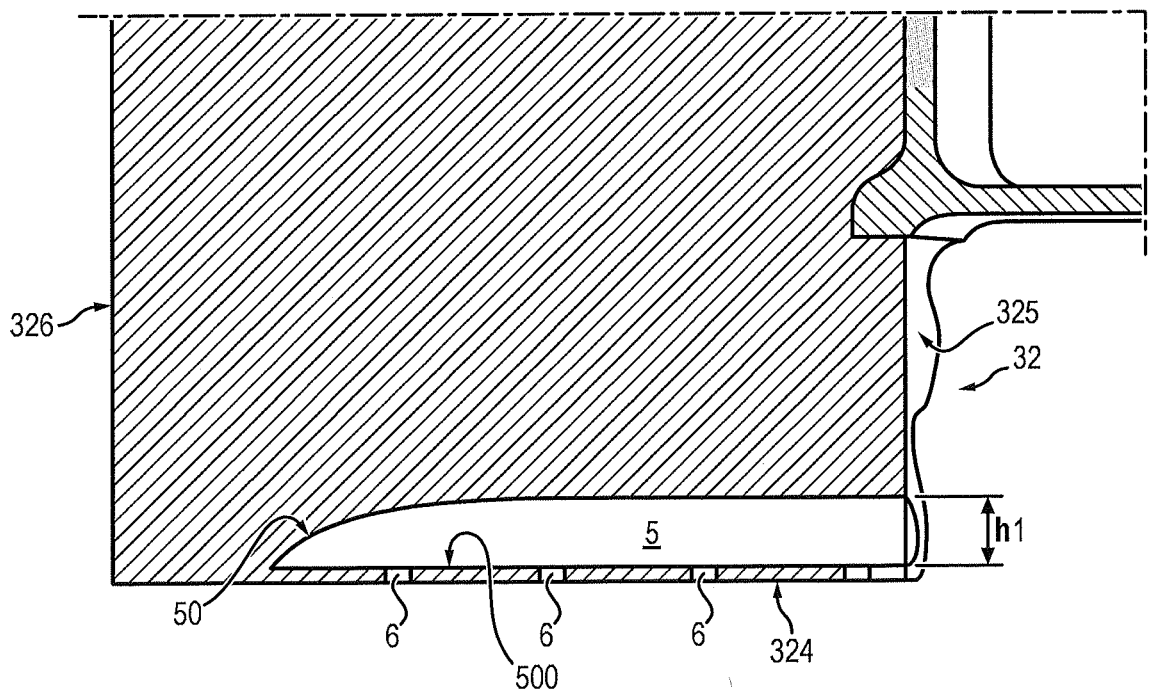
FIG. 6 is a longitudinal (axial) sectional view of the radially inner portion of a blade root in accordance with another variant embodiment of the invention.

Also preferably, this blind hole 5 extends over the major portion of the axial length of the blade root 32, as better seen in the sectional view of FIG. 6.

This hole 5 is blind, so that it opens onto the upstream face 325 of the root 32 (see FIG. 5) but does not open onto the opposite downstream face 326 of this root.

Preferably, this hole 5 is located at the center of the root and therefore of the radially inner lobe 321, so as to reduce its mechanical impact and reduce the concentration of stresses that are applied at the root.

The radially inner wall of the blind hole 5 carries the reference 500.

Figure 5:
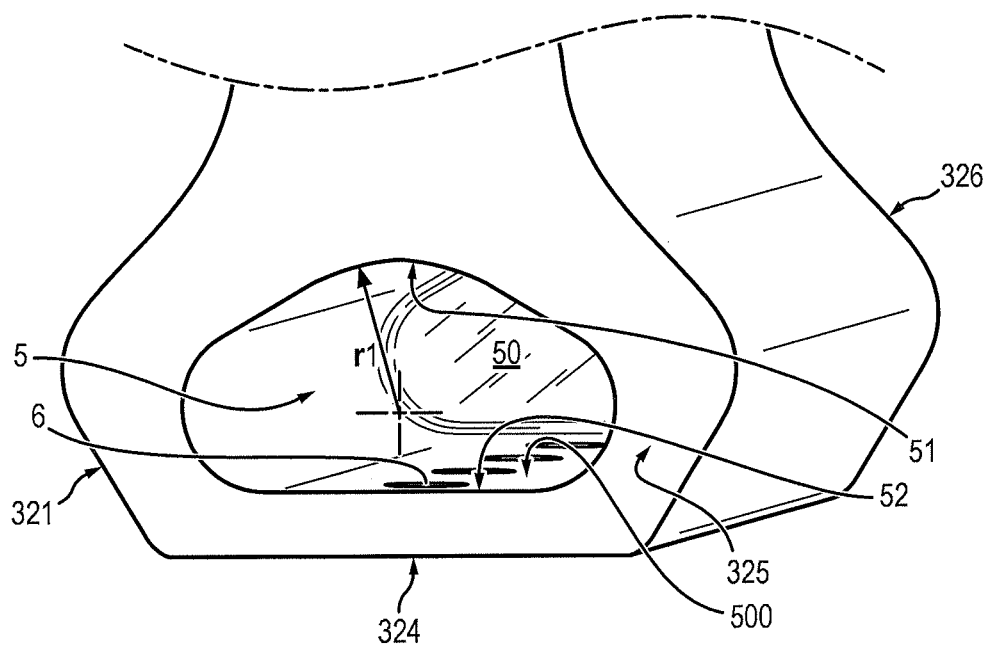
FIG. 5 is a perspective and detail view of the radially inner portion of the blade root of FIG. 3.

Preferably, and as better seen in FIG. 5, this blind hole 5 has a dome-shaped cross section, that is to say a section whose radially outer side 51 is curved preferably with a large radius of curvature r1 and whose radially inner side 52 is preferably rectilinear. This allows limiting the mechanical stresses at the side 51 subjected to strong traction.

When the blind hole 5 has a dome-shaped cross section, its radially inner wall 500 is therefore planar.

In accordance with the invention, this root 32 is also provided with a plurality of air ejection orifices 6, which extend mainly radially through the radially inner end of the root, (here through that of the radially inner lobe 321). Each air ejection orifice 6 opens at one of its ends into said blind hole 5, more specifically onto its radially inner wall 500, and opens at its opposite end onto the radially inner face 324 of the root, thus putting in fluid (air) communication, the blind hole 5 and the bottom 232 of the cell 23, when the blade 3 is inserted into the rotor disc 2.

These air ejection orifices 6 have a small diameter proportionally to the dimensions of the blind hole 5, which allows to achieve a cooling of the bottom 233 of the cell by air jets impact. For a purely illustrative purpose, these orifices can have a diameter of the order of 1 mm to 5 mm while the blind hole 5 has a width comprised between about 5 mm and 20 mm.

Figure 3:
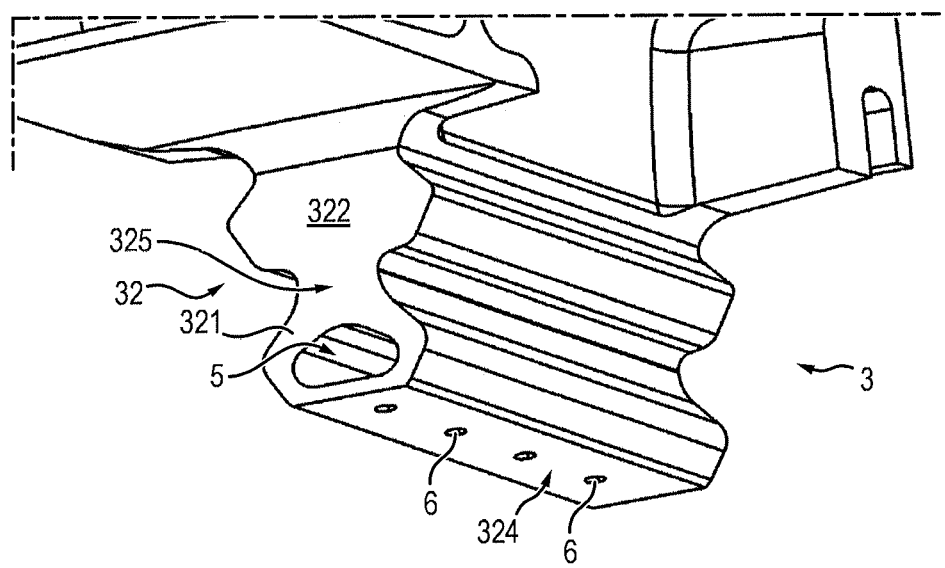
FIG. 3 is a perspective view of the blade root of FIG. 2.

According to a first embodiment shown in FIG. 3, the different air ejection orifices 6 are aligned in a single line, preferably axial line (direction x).

Figure 4:
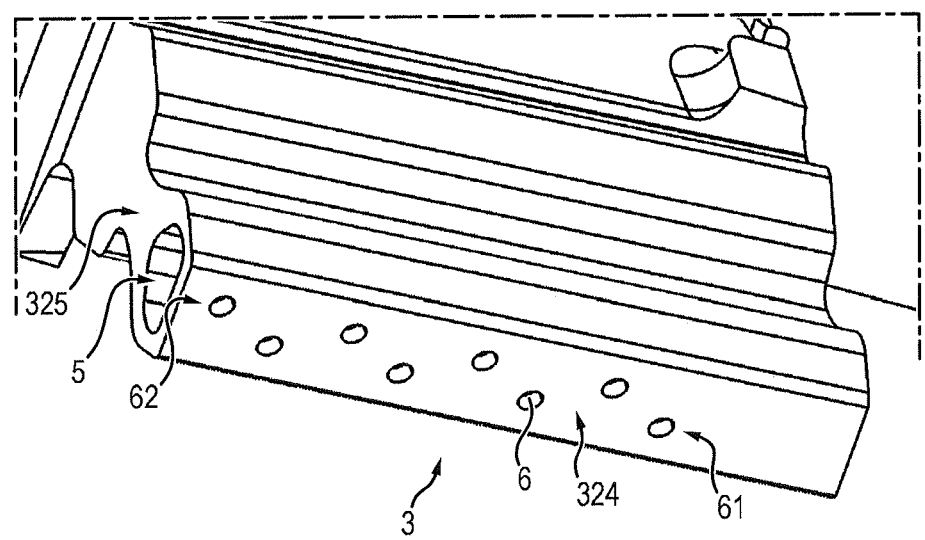
FIG. 4 is a perspective and bottom view of a variant embodiment of a blade root.

According to one variant embodiment shown in FIG. 4, the air ejection orifices 6 are disposed in two lines 61, 62 parallel to each other, preferably axial lines. Preferably, the orifices 6 of one line are offset, for example by a half pitch, relative to the orifices 6 of the other line.

The air coming from upstream of the rotor and which axially penetrates into the blind hole 5 is radially redirected in the direction of the bottom 233 of the cell 23, via the air ejection orifices 6. The cell 23 also axially receives air from upstream of the rotor. This creates at the cell, a phenomenon of turbulence (due to the flow crossing), which allows a more efficient cooling of the bottom 233 of the cell 23.

The number of orifices 6 is to be adapted depending on the desired cooling while taking into account the mechanical stresses of the blade root and while avoiding the weakening of this root.

The mechanical resistance of the rotor disc 2 is thus improved.

Figure 1:
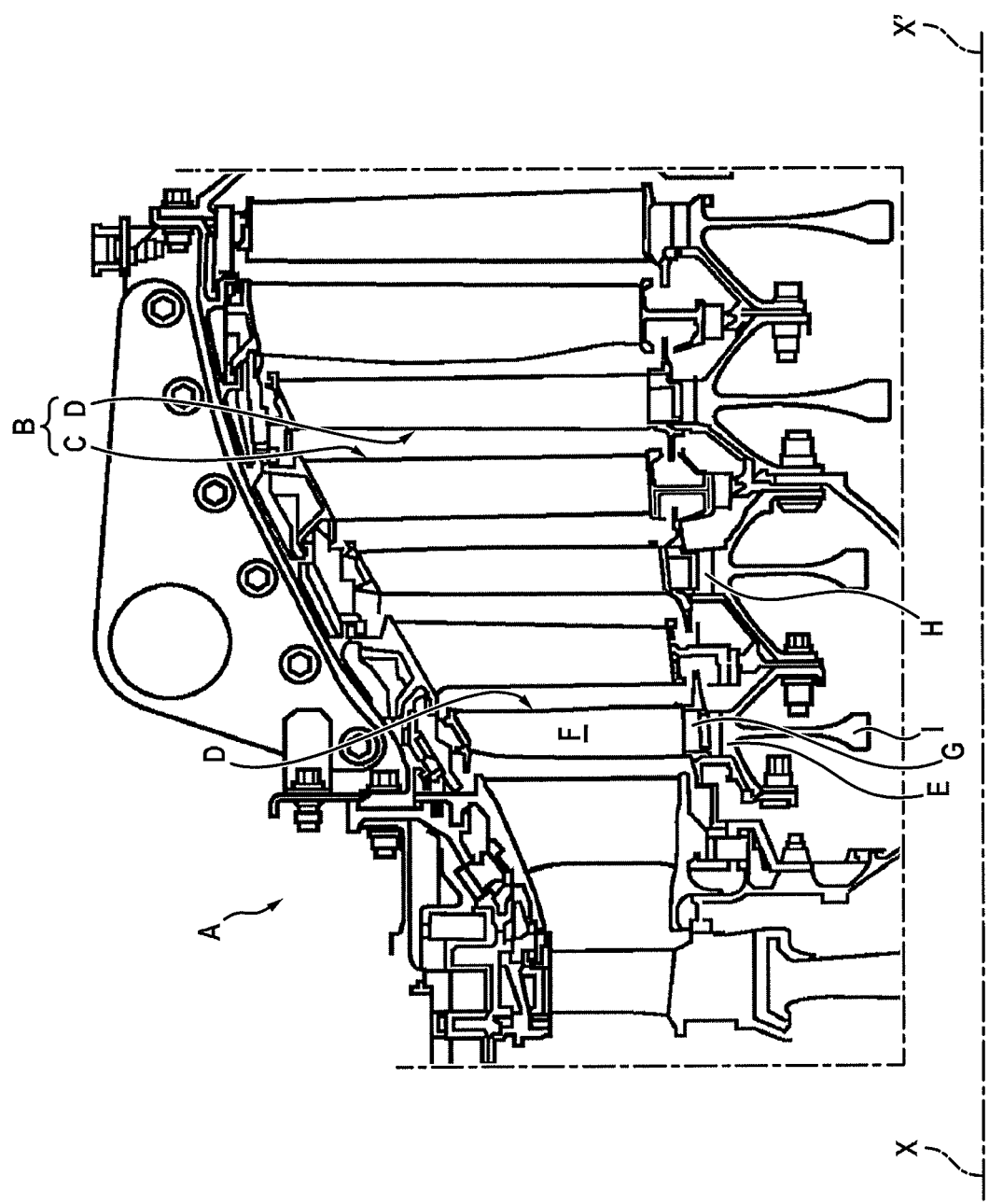
FIG. 1 is a longitudinal (that is to say axial) sectional view of a turbomachine turbine according to the state of the art.

Furthermore, the weight gain achieved by forming the blind hole 5 in each blade is of the order of about one gram per blade. In addition, the bottom 233 of the cell 23 being better cooled, the rotor disc 2 can be produced with a less massive hub of the disc. An example of such a hub I is visible in FIG. 1. As a purely illustrative example, the weight gain on the hub, combined with the weight gain on the blade root, allows gaining about 1 kg per rotor disc 2 for a turbine.

A variant embodiment of the root is shown in FIG. 6.

In this case, the blind hole 5 has a decreasing height h1 in the direction of the bottom 50 thereof, either from the entrance of the hole 5 or from any point along its length (in the example of FIG. 6, it can be seen that the height h1 is decreasing from substantially half the hole). This shape has the effect of avoiding pressure drops and maintaining a sufficient airflow, including in the orifices 6 located in the proximity of the blind hole 5 bottom 50.

Preferably, the upper wall of the downstream end of the blind hole 5 is curved towards the bottom so that the hole ends in a point (tip) and at least one air ejection orifice 6 opens at this point (see FIG. 6). This shape allows channeling the air to the bottom and to the last orifice(s) 6, without pressure drops.

According to one variant embodiment, not shown in the figures, the blade root 32 can comprise a single radially inner lobe, pierced by the blind hole 5 and the orifices 6. In other words, it does not have a lobe 322.

According to another variant embodiment not shown in the figures, it would also be possible to provide a blind hole 5 in the radially outer lobe 322 and air ejection orifices connecting the blind hole formed in the lobe 322 to the blind hole 5 formed in the radially inner lobe 321.

Figure 8:
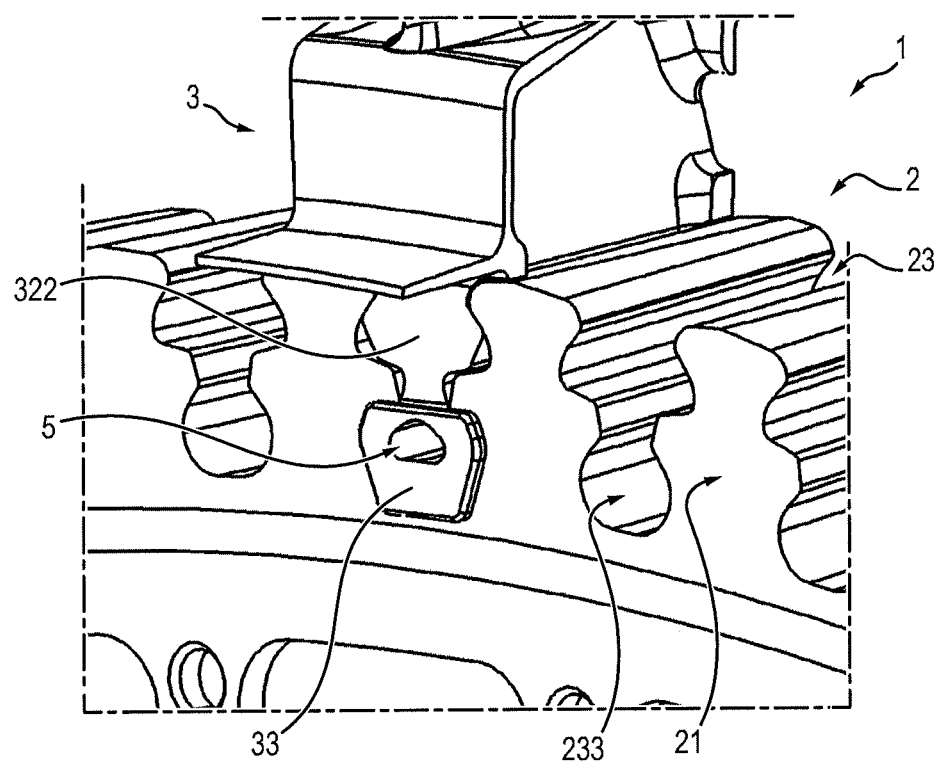
FIG. 8 is a perspective view of a portion of a rotor disc and a portion of a blade in accordance with a second embodiment of the invention.
Figure 9:
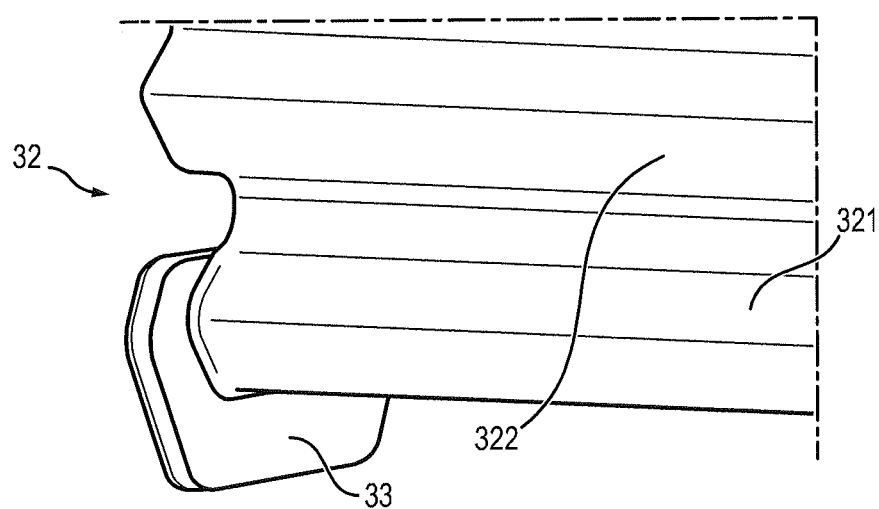
FIG. 9 is a perspective view of a portion of the blade root shown in FIG. 8.

According to another variant embodiment shown in FIGS. 8 and 9, the radially inner lobe 321 of the root 32 is provided with a cover 33, shaped to seal the residual space between said radially inner lobe 321 and the walls of the cell 23 in which this lobe is located. This cover 33 advantageously consists of a plate disposed on the upstream side of the root 32. Thus, the air can no longer penetrate directly into the cell 23 and all the air flow is forced to pass through the blind hole 5 then the air ejection orifices 6. The cooling of the cell bottom is thus accentuated.

Advantageously and as better seen in FIG. 9, the cover 33 can even be larger than the inner portion 231 of the cell 23 and allow the axial stop of the blade 3. The cover 33 then abuts against the upstream face 21 of the disc.

Depending on the shape of the root 32 (for example if it is not fir tree-shaped), the cover 33 can be secured to the single lobe of the root.

Furthermore, the rotor 1 in accordance with the invention also comprises an air supply circuit 7, which guides part of the air entering the rotor until the entrance of the blind hole 5 and possibly until the entrance of the cells 23 if the root 32 is not equipped with the cover 33.

Figure 7:
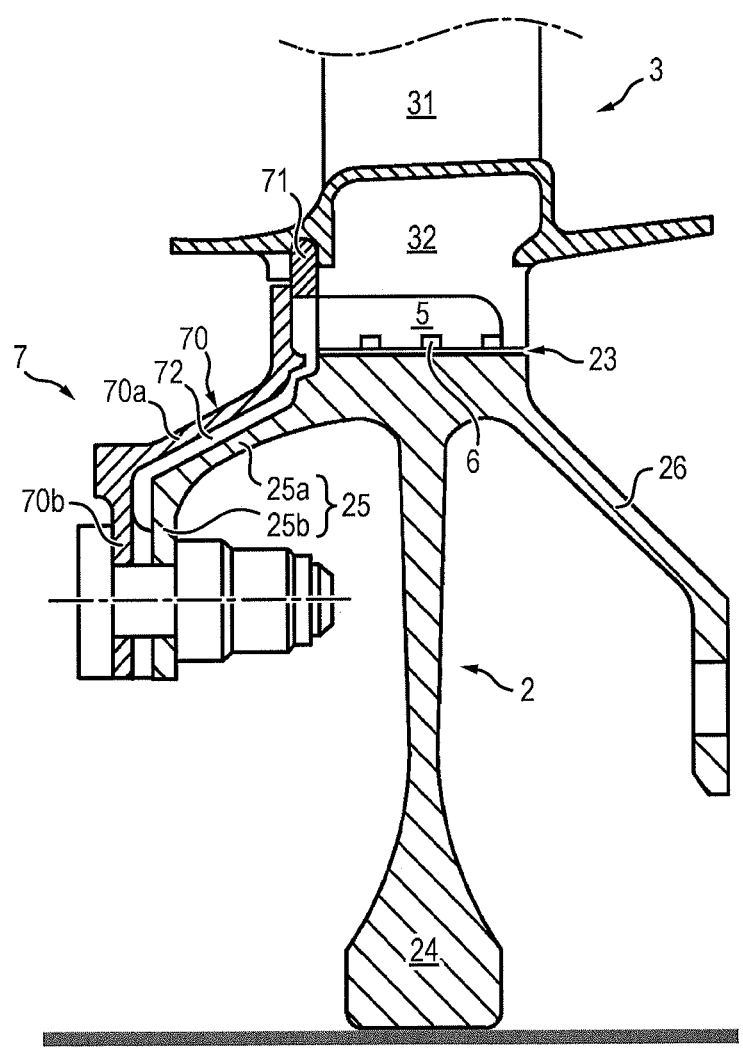
FIG. 7 is an axial sectional view of the radially inner portion of a blade root, of the rotor disc and of an exemplary embodiment of an air supply device.

An exemplary embodiment of such an air circuit 7 is shown in FIG. 7.

In this figure, it can be seen that the rotor disc 2 comprises on either side of the central hub 24, an upstream annular flange 25 and a downstream annular flange 26.

The upstream annular flange 25 comprises a substantially axial annular portion 25a which is extended by a substantially radial annular portion 25b.

The circuit 7 comprises an annular end plate 70 mounted facing the upstream face of the upstream annular flange 25 of the disc 2 with the interposition of an annular snap ring 71.

The end plate 70 comprises a substantially axial annular portion 70a and a substantially radial annular portion 70b.

The end plate 70 substantially conforms to the shape of the upstream flange 25. It is disposed at a short distance therefrom, so as to form therewith an annular space 72 forming a cavity for diffusing the cooling air. This cavity 72 opens upstream onto one or more intake opening(s) of the air penetrating into the rotor and downstream facing the blind holes 5 and optionally facing the entrance of the cell 23. Thus, the air is guided therein so as to cool the cells 23 and the blade roots 32.

The invention claimed is:

1. A rotor of a turbomachine turbine, comprising a rotor disc and a plurality of blades distributed at its periphery, said rotor disc comprising a plurality of cells which extend mainly axially and which are regularly distributed at its periphery, around the axis of the rotor, each blade comprising a root mounted and retained in one of the cells of said rotor disc, each root being dimensioned so as to form a space between a bottom of the cell and a radially inner face of the root, wherein said root comprises a blind hole which extends mainly axially and which opens onto an upstream face of the root and a plurality of air ejection orifices, wherein said blind hole has a dome-shaped cross section whose a radially outer side is curved and a radially inner side is straight and wherein each air ejection orifice extends mainly radially and opens at one end of the air ejection orifice into said blind hole and at another end of the air ejection orifice onto the radially inner face of the root located facing the bottom of the cell.

2. The rotor according to claim 1, wherein said blind hole has a radially inner wall and wherein each air ejection orifice opens at one of its ends onto said radially inner wall of the blind hole and at its other end onto the radially inner face of the root, located facing the bottom of the cell.

3. The rotor according to claim 2, wherein said blind hole has the radially inner wall of the blind hole is planar.

4. The rotor according to claim 1, wherein the root has a fir tree shape comprising a radially inner lobe and a radially outer lobe, said blind hole being formed in the radially inner lobe and said air ejection orifices being formed in a radially inner end of said radially inner lobe.

5. The rotor according to claim 1, wherein a height of the blind hole is reduced over at least part of the length of said blind hole, in the direction of a bottom of the blind hole.

6. The rotor according to claim 5, wherein a downstream end of the blind hole is curved and ends in a point and wherein at least one air ejection orifice opens at this point.

7. The rotor according to claim 1, wherein the air ejection orifices are all aligned.

8. The rotor according to claim 1, wherein the air ejection orifices extend along at least two parallel lines.

9. The rotor according to claim 8, wherein said air ejection orifices of one line are axially and circumferentially offset relative to the air ejection orifices of another line.

10. The rotor according to claim 1, wherein the blade root is provided with a cover shaped to prevent air from axially emerging into a space provided between the bottom of the cell and the radially inner face of the root.

11. The rotor according to claim 1, wherein it comprises an air supply circuit formed between an upstream annular flange of the rotor disc and an annular end plate mounted facing and at a distance from the upstream annular flange, the air supply circuit opening into the blind holes and/or into the cells.

12. A turbomachine turbine comprising at least one rotor according to claim 1.

13. A turbomachine comprising at least one turbine according to claim 12.

* * * * *